United States Patent
Budic et al.

(10) Patent No.: US 8,532,666 B2
(45) Date of Patent: Sep. 10, 2013

(54) METHOD FOR CONTROLLING INTERFERENCE IN FEMTO CELL DEPLOYMENTS

(75) Inventors: Miroslav Budic, Murphy, TX (US); Jeffrey Wade Scott, Murphy, TX (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 12/919,878

(22) PCT Filed: Mar. 24, 2009

(86) PCT No.: PCT/US2009/038094
§ 371 (c)(1),
(2), (4) Date: Aug. 27, 2010

(87) PCT Pub. No.: WO2009/120689
PCT Pub. Date: Oct. 1, 2009

(65) Prior Publication Data
US 2011/0003597 A1    Jan. 6, 2011

Related U.S. Application Data

(60) Provisional application No. 61/039,176, filed on Mar. 25, 2008.

(51) Int. Cl.
*H04W 36/00* (2009.01)

(52) U.S. Cl.
USPC .............. 455/444; 455/443; 455/454

(58) Field of Classification Search
USPC .......... 455/424, 426.1, 435.2, 436, 442–444, 455/449, 450, 545; 370/328
See application file for complete search history.

(56) References Cited

U.S. PATENT DOCUMENTS

| | | | |
|---|---|---|---|
| 5,946,612 A * | 8/1999 | Johansson | 455/405 |
| 6,477,373 B1 * | 11/2002 | Rappaport et al. | 455/436 |
| 6,678,530 B1 | 1/2004 | Hunzinger | |
| 7,095,987 B2 | 8/2006 | Brothers, Jr. et al. | |
| 7,817,592 B2 * | 10/2010 | Yun et al. | 370/328 |

(Continued)

FOREIGN PATENT DOCUMENTS

| | | |
|---|---|---|
| CN | 1513275 | 7/2004 |
| JP | 2004112642 | 4/2004 |

(Continued)

OTHER PUBLICATIONS

International Search Report and Written Opinion dated May 27, 2009 for International Application No. PCT/US2009/038094, International Filing Date: Mar. 24, 2009 consisting of 8-pages.

(Continued)

*Primary Examiner* — Dominic E Rego
(74) *Attorney, Agent, or Firm* — Wolfe-SBMC

(57) ABSTRACT

A method and system provide a plurality of femto cells that are deployed within a macro cell of cellular network. The femto cells improve cellular service inside structures, such as residential and commercial structures. Femto base stations convert signals between an airlink-interface and core network to enable data communication between the mobile terminal and an access network to occur through the Internet and a public switched telephone network. The femto base stations are independent of each other and the macro cell. The method and system provide the femto base stations with interference awareness and mitigation techniques to minimize interference with the cellular network.

20 Claims, 4 Drawing Sheets

(56) References Cited

U.S. PATENT DOCUMENTS

| | | | |
|---|---|---|---|
| 8,121,089 B2 * | 2/2012 | Bao et al. | 370/331 |
| 2002/0049061 A1 * | 4/2002 | Pinola | 455/452 |
| 2004/0029588 A1 * | 2/2004 | Kikuma et al. | 455/436 |
| 2004/0252666 A1 | 12/2004 | Johnson | |
| 2006/0270434 A1 | 11/2006 | Iacono | |
| 2008/0069028 A1 * | 3/2008 | Richardson | 370/328 |
| 2011/0317574 A1 * | 12/2011 | Richardson | 370/252 |

FOREIGN PATENT DOCUMENTS

| | | |
|---|---|---|
| JP | 2007306407 | 11/2007 |
| WO | WO-2006054341 | 5/2006 |
| WO | WO-2007015066 | 2/2007 |
| WO | WO-2007139680 | 12/2007 |

OTHER PUBLICATIONS

"3G Home NodeB Study Item Technical Report", *3rd Generation Partnership Project Technical Specification Group Radio Acc Networks*, 3GPP TR 25.820 V8.0, (2008), 5 pages.

"Foreign Office Action", Chinese Application No. 200980111095.1, (Jan. 14, 2013), 6 pages.

"Foreign Office Action", Japanese Application No. 2011-501979, (Mar. 5, 2013), 7 pages.

* cited by examiner

US 8,532,666 B2

METHOD FOR CONTROLLING INTERFERENCE IN FEMTO CELL DEPLOYMENTS

CROSS-REFERENCE TO RELATED APPLICATIONS

This application is a Submission Under 35 U.S.C. §371 for U.S. National Stage Patent Application of International Application Number: PCT/US2009/038094, filed Mar. 24, 2009 entitled "METHOD FOR CONTROLLING INTERFERENCE IN FEMTO CELL DEPLOYMENTS," which claims priority to U.S. Provisional Application Ser. No. 61/039,176, filed Mar. 25, 2008, the entirety of both which are incorporated herein by reference.

FIELD OF THE INVENTION

The invention relates to reducing interference between macro cells and femto cells that convert signals between an airlink-interface and a core network, and more particularly to a method and system for controlling transmission power levels and providing optimum operating frequency selection algorithms for femto base stations.

BACKGROUND OF THE INVENTION

Wireless carriers employ cellular towers to establish large cells to provide wireless communications to cover large physical areas, such as metropolitan or rural areas. The large cells or macro cells may cover areas of 1 km to 5 km in diameter. A cellular tower broadcasts wireless signals throughout the macro cell to large numbers of mobile handsets.

Various structures are typically located within the macro cell that obstruct, reflect or otherwise interfere with the wireless signals. For example, users typically attempt to use mobile devices inside homes or commercial establishments. These structures may be made from high loss material, such as concrete or metal, which block wireless signals from entering into the structures. The weak wireless signal reception within these structures degrades the quality of service, resulting in unreliable mobile communications. A system and method are needed to improve cellular service inside structures.

SUMMARY OF THE INVENTION

The invention advantageously provides a method and system having interference awareness and provides mitigation techniques to femto base stations for minimizing interference with the cellular network. In accordance with one embodiment, the invention provides a method of reducing interference between a femto cell and a macro cell in a wireless communication network. The method includes identifying a plurality of preselected wireless signal carriers based on a predefined geographical area and measuring initial power levels for the wireless signal carriers provided in the predefined geographical area. One of the wireless signal carriers is selected based on predefined criteria associated with the measured initial power level. A transmission power level of a femto transmitter is adjusted based on a communication placed to a mobile terminal.

In accordance with another aspect, the invention provides a system for reducing interference between a femto cell and a macro cell in a wireless communication network. The system includes a carrier selection module that identifies a plurality of preselected wireless signal carriers based on a predefined geographical area, measures initial power levels for the wireless signal carriers provided in the predefined geographical area and selects one of the wireless signal carriers based on predefined criteria associated with the measured initial power level. A fine tuning module is provided to adjust a transmission power level of a femto transmitter based on a communication placed to a mobile terminal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
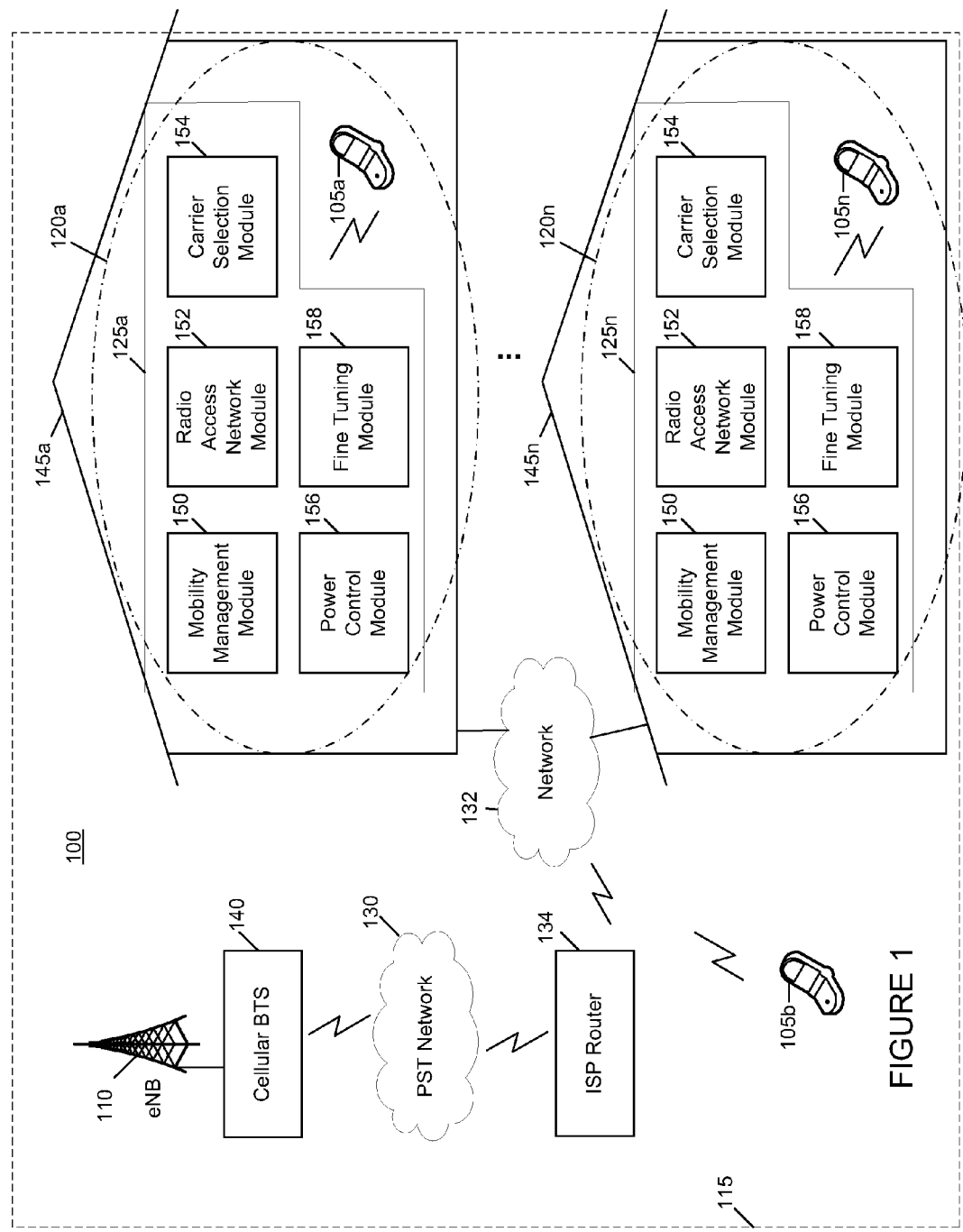
FIG. 1 is a block diagram of an exemplary network architecture for wireless access networks constructed in accordance with the principles of the invention.

The invention provides femto base stations or home evolved Node-B to improve cellular service inside structures, such as residential and commercial structures, among other structures. The femto base stations may operate in the femto power range of about +15 dBm and may provide an operation range of approximately 50 meters. The femto base stations are coupled to the Internet and access mobile networks through the publicly-switched telephone network. The femto base stations may use existing broadband backhaul infrastructure from corresponding structures to access the publicly-switched telephone network. For example, the femto base stations may be coupled to a digital subscriber line ("DSL") to access the publicly-switched telephone network.

According to one embodiment, the invention may operate with existing cellular networks, such as CDMA2000 1xRTT, evolution-data optimized ("EV-DO") and long-term evolution ("LTE") networks, among other cellular networks. For example, the femto base stations or integrated low power consumer base transceiver stations ("BTS") and base station controllers (BSC) may form femto cells to communicate with the mobile terminals using CDMA technology. The femto base stations may communicate over the Internet using Session Initiation Protocol ("SIP"), among other signaling protocols. The femto base stations convert signals between air interface and SIP to enable data communication between the mobile terminal and the Internet, thereby seamlessly providing service to wireless users.

The invention supports a plurality of femto cells that are deployed within a macro cell. While the various femto base stations are components of the overall communications network, each femto cell is separate from the existing macro cell and any adjacent femto cells. During mobility, the system hands the mobile terminal communication session from a femto cell to the macro cell, or vice versa, or from a femto cell to another femto cell.

According to one embodiment, the macro cells and the femto cells employ different core networks, resulting in inter-technology handoffs or vertical handoffs ("VHO") between the cells. VHO are performed when the mobile terminals roam between different core networks, including moving out of a preferred network or moving into a preferred network. The handoff procedures may be initiated when signal strength measurements originating in the active network, such as the cellular network or the femto network, fall below pre-selected threshold parameters. The mobile terminal may detect the weak signal strength emanating from the "active" access network and may initiate a handoff to the "idle" access network, such as the femto base station network or the cellular network, having a stronger signal strength, by reporting the weak signal to the active access network.

Alternatively, the handoff procedures may be initiated to off-load mobile terminal traffic from the cellular network to the femto base station network. The femto base station is a personal and dedicated base station for each corresponding structure. The femto base stations and the cellular network supporting the macro cell independently support network traffic. Since the femto cells deployed within the macro cell are independently operated within the cellular network, the system does not provide integrated interference management between the macro cells and the femto cells. If unregulated, the cellular network and the femto base station networks produce mutual interference that may degrade system quality of service. The invention provides the femto base stations with interference awareness and mitigation techniques to minimize interference with the cellular network.

Referring now to the drawing figures in which like reference designators refer to like elements, FIG. 1 illustrates an exemplary block diagram of a system designated generally as "100" that enables mobile terminals 105a-105n (referred to collectively herein as "mobile terminals 105") to communicate with evolved Node-B ("eNB") 110 using a first access network 115 or second access networks 120a-120n (referred to collectively herein as "second access networks 120") in accordance with the principles of the invention. The eNB 110 may include servers, transceivers for transmitting and receiving radio signals, and antennas. The eNB 110 may include two-way transceivers that broadcast data into the surrounding environment and typically act as mediators between wired and wireless networks.

The mobile terminals 105 may include a wide range of portable electronic devices, including but not limited to mobile phones, personal data assistants ("PDA") and similar devices, which use the various communication technologies such as advanced mobile phone system ("AMPS"), time division multiple access ("TDMA"), code division multiple access ("CDMA"), global system for mobile communications ("GSM"), general packet radio service ("GPRS"), 1x evolution-data optimized (abbreviated as "EV-DO" or "1xEV-DO") and universal mobile telecommunications system ("UMTS"). The mobile terminals 105 also include hardware and software suitable to support the control plane functions needed to engage in wireless communication with eNB 110 and femto base stations 125. Such hardware may include a receiver, transmitter, central processing unit, storage in the form of volatile and nonvolatile memory, and input/output devices, among other hardware.

The first access network 115 may include a CDMA 1xRTT network, an EV-DO network or a LTE network, among other access networks. The second access networks 120 may include femto base stations 125a-125n (referred to collectively herein as "femto base stations 125") that are coupled to a public switched telephone (PST) network 130 via a local network 132, such as the Internet, and an Internet Service Provider (ISP) router 134. The PST network 130 may be coupled to a cellular base transceiver station (BTS) 140, which is coupled to the eNB 110. The system 100 coordinates handing off the mobile terminals 105 between the first access network 115 and the second access networks 120.

The cellular network operates in a conventional manner, controlling the first access network or the macro cell 115 to efficiently cooperate with adjacent macro cells. For example, the cellular network may adjust characteristics, such as transmission power or noise level, among other characteristics.

The invention is directed to managing the second access networks 120. The second access networks 120 may be provided to operate inside corresponding structures 145a-145n (referred to collectively herein as "structures 145"). The structures 145 may include residential or commercial structures, among other structures. The structures 145 may be made from high loss materials, such as concrete, brick or metal, among other high loss materials that block wireless signals from penetrating the structures 145. As a result, any communication signals that are broadcast from the eNB 110 may not be received within the structures 145. Similarly, any communication signals that are broadcast from the femto base stations 125 may not be transmitted outside the structures 145. Likewise, any communication signals that are broadcast from the mobile terminals 105 while located inside the structures 145 may not be received at the eNB 110. Any communication signals that are broadcast from the mobile terminals 105 while located outside the structures 145 may not be received at the femto base stations 125.

The second access networks 120 are localized networks that are established by users to provide communication signals inside corresponding structures 145. A decision to initiate hand off of the mobile terminal 105 between the first access network 115 and the second access networks 120 may occur when the "active" access network determines that the relevant mobile terminal 105 will be better served by the "idle" access network. Criteria for initiating a hand off between the first access network 115 and the second access networks 120 include preventing the mobile terminals 105 from "falling off" the active access network or alleviating load conditions at the active access network, among other criteria. In this regard, the femto cells 120 may be configured to concurrently support various terminal devices 105. Any terminal devices 105 that are supported by the second access network, through femto base station 125, are routed to the cellular base transceiver station 140 via network 132. Thus, these mobile devices 105 do not use resources from the first access network 115. However, deploying a large number of active femto cells 120 within a macro cell 115 may increase a probability of overloading cellular network resources, such as overloading the macro cell uplink and degrading/increasing interference levels to the mobile devices 105 on the down link, among other forms of overloading cellular network resources. Overloading cellular network resources limit macro cell coverage area and capacity.

The femto base stations 125 may include a central processing unit ("CPU"), transmitter, receiver, I/O devices and storage, such as volatile and nonvolatile memory, to implement the functions described herein. The femto base stations 125 may communicate with the mobile terminals 105 over a radio interface.

The femto base station 125 may be of modular construction to facilitate adding, deleting, updating and/or amending modules therein and/or features within modules. Modules may include a mobility management module 150, a radio access network ("RAN") module 152, a carrier selection module 154, a power control module 156, and a fine tuning module 158, among other modules. The mobility management module 150 manages the hand off of the mobile terminals 105 between the macro cell 115 and the femto cell 120, performs authentication of mobile terminals 105 and provides supplementary services. The RAN module 152 performs an air-interface to SIP translation and converts between the first access network protocol and the second access network protocol, and vise versa. For example, the RAN module 152 may provide conversion between CDMA/3GPP communications over the air and SIP communications via the broadband backhaul.

During an initialization period, the carrier selection module 154 may access a memory structure to obtain a list of available wireless carriers and corresponding frequency ranges. For example, the carrier selection module 154 may access a database to obtain a list of wireless carriers that are available for a predefined geographical area. The geographical area information may be obtained manually by requesting information from the user or automatically through a global positioning system, or other techniques. The carrier selection module 154 may activate a CDMA forward link receiver to measure the initial power level ($I_o$) or the Received Signal Strength Indication ("RSSI") within a selected bandwidth to identify the strength of the incoming signal. The carrier selection module 154 may sort the $I_o$ or RSSI information according to predefined criteria. The predefined criteria may include, for example, power level or amount of loading, among other predefined criteria. The carrier selection module 154 may select a wireless carrier by selecting a frequency that is unoccupied, free of interference, or contains a minimum amount of power. Systems that generate high power readings typically include high traffic volume.

Alternatively, the carrier selection module 154 may include an operation manager that eliminates any unused CDMA carriers from the list of available carriers. Any unused CDMA carriers may be preserved for future expansion opportunities.

After selecting a wireless carrier, the power control module 156 may perform a coarse power adjustment of a transmitter that is associated with the femto base station 125. The power control module 156 may be configured to define a boundary for the femto cells 120 that remains within the corresponding structure 145. Otherwise, if the femto cell 120 is not managed to operate within the corresponding structure 145, then the transmission power from the femto base station 125 may negatively impact performance of the macro cell uplink or downlink. One formula for adjusting the power level may include: (Measured Macro Cell Initial Power Level)−(Expected Femto Path Loss)=Femto Initial Transmission. The measured macro cell initial power level is a femto measured initial power level for the selected wireless signal carrier. The expected femto path loss is a pre-defined variable based on a femto location or a profile for deployment. The expected femto path loss may be obtained by requesting the information from users during an initial set-up procedure.

During an initial set-up, the user may be prompted to enter a description of the intended environment for the femto base station 125. The description may include a type of structure, such as an apartment, a single family home, a warehouse, and an approximate square foot measurement. The apartment may be defined to include a cell radius of 10 m, with an expected path loss of 39 dB (for 1 m at 1900 Hz) and +30 dB for every 10× distance.

In addition to interfering with the macro cell, a femto cell also may interfere with adjacent femto cells. For example, the femto cell 120a may interfere with adjacent femto cell 120n. The invention is directed to minimizing interference between the macro cell and associated femto cells that are deployed on the same radio frequency ("RF") carriers. To minimize interference between adjacent femto cells, the carrier selection module 154 may select a wireless carrier for a femto cell that is initialized second in time that is different from a femto cell that is initialized first in time. The carrier selection module 154 may activate a CDMA forward link receiver to measure the initial power level ($I_o$) or the Received Signal Strength Indication ("RSSI") within a selected bandwidth to identify the strength of the incoming signal. The carrier selection module 154 may sort the $I_o$ or RSSI information according to predefined criteria. The predefined criteria may include, for example, power level or amount of loading, among other predefined criteria.

After establishing the initial power transmission level, the fine tuning module 158 may initiate a call to the target mobile terminal 105. The fine tuning module 158 sends a message to the target mobile terminal 105, such as an IS-2000/IS-856 message, requesting periodic pilot strength measurements. The fine tuning module 158 compares the received pilot strength measurement to predefined threshold. If the pilot strength measurement exceeds the predefined threshold value, then the transmission power is reduced and the reception attenuation is increased by a preselected amount, such as 1 dB or other amount. The fine tuning module 158 repeats the process of decreasing the transmission power until the pilot strength measurement falls below the predefined threshold value.

Figure 2:
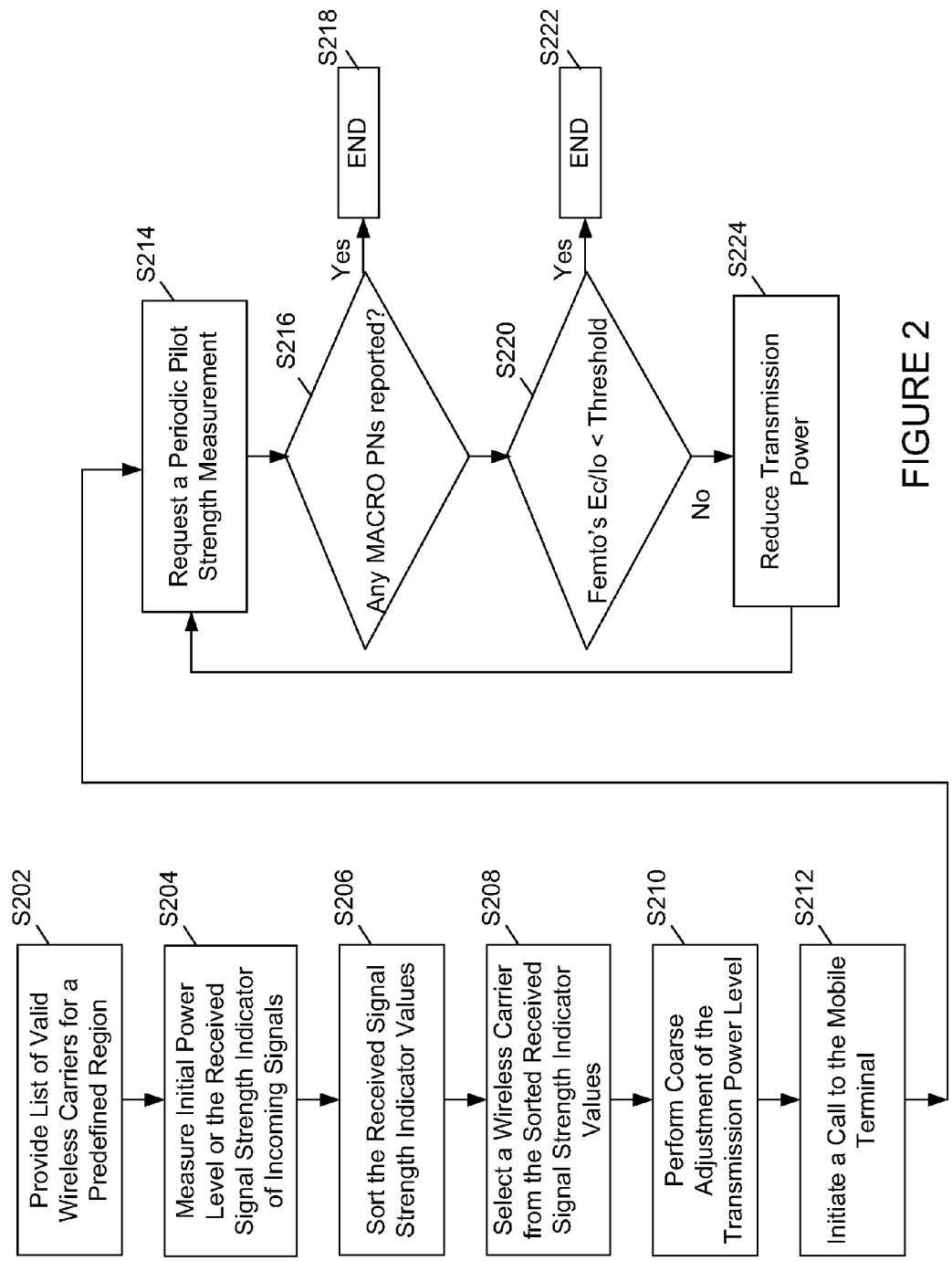
FIG. 2 is a flow diagram of a method for adjusting the power level of a femto cell base station for a 1xRTT network in accordance with the principles of the present invention.

An exemplary power adjustment algorithm for the femto base station 125 operating in the 1xRTT network is discussed with reference to FIG. 2. In step S202, at initialization, an operation manager provides a list of valid wireless carriers that are authorized for a preselected region. The initial power level ($I_o$) or the Received Signal Strength Indication (RSSI) is measured within a selected bandwidth to identify the strength of the incoming signal (step S204). In step S206, the RSSI is sorted from lowest to highest. A wireless carrier is selected from the highest sorted RSSI (step S208). In step S210, a coarse adjustment of the transmission power level is performed. The network initiates a call to the mobile terminal (step S212). A periodic pilot strength measurement is requested (step S214). In step S216, a determination is made of whether any macro cell private network ("PN") is reported. The process is terminated when the macro cell PN is reported (step S218). If a PN is not reported then a threshold value comparison is performed (step S220). If a ratio of a received pilot energy value to the total received energy ($E_c/I_o$) value is below a threshold value, then the process is terminated (step S222). Otherwise, if the $E_c/I_o$ ratio is above a predefined threshold value, then the transmission power is reduced (step S224). Steps S214-S224 are repeated until the macro cell PN is reported and terminated in step S218 or the $E_c/I_o$ ratio is below a threshold value and the process is terminated in step S222.

The system 100 permits establishing adjustable parameters for the 1xRTT network to optimize the power adjustment algorithm of the femto base station 125. The adjustable parameters may include power levels (e.g., $E_c/I_o$ threshold), handoff settings (e.g., T-Add, T-Drop, T-Comp thresholds), periodicity of pilot strength measurement message (PPSMM), search windows, filtering constant (e.g., $E_c/I_o$ measurements and the femto power control step, among other parameters.

Figure 3:
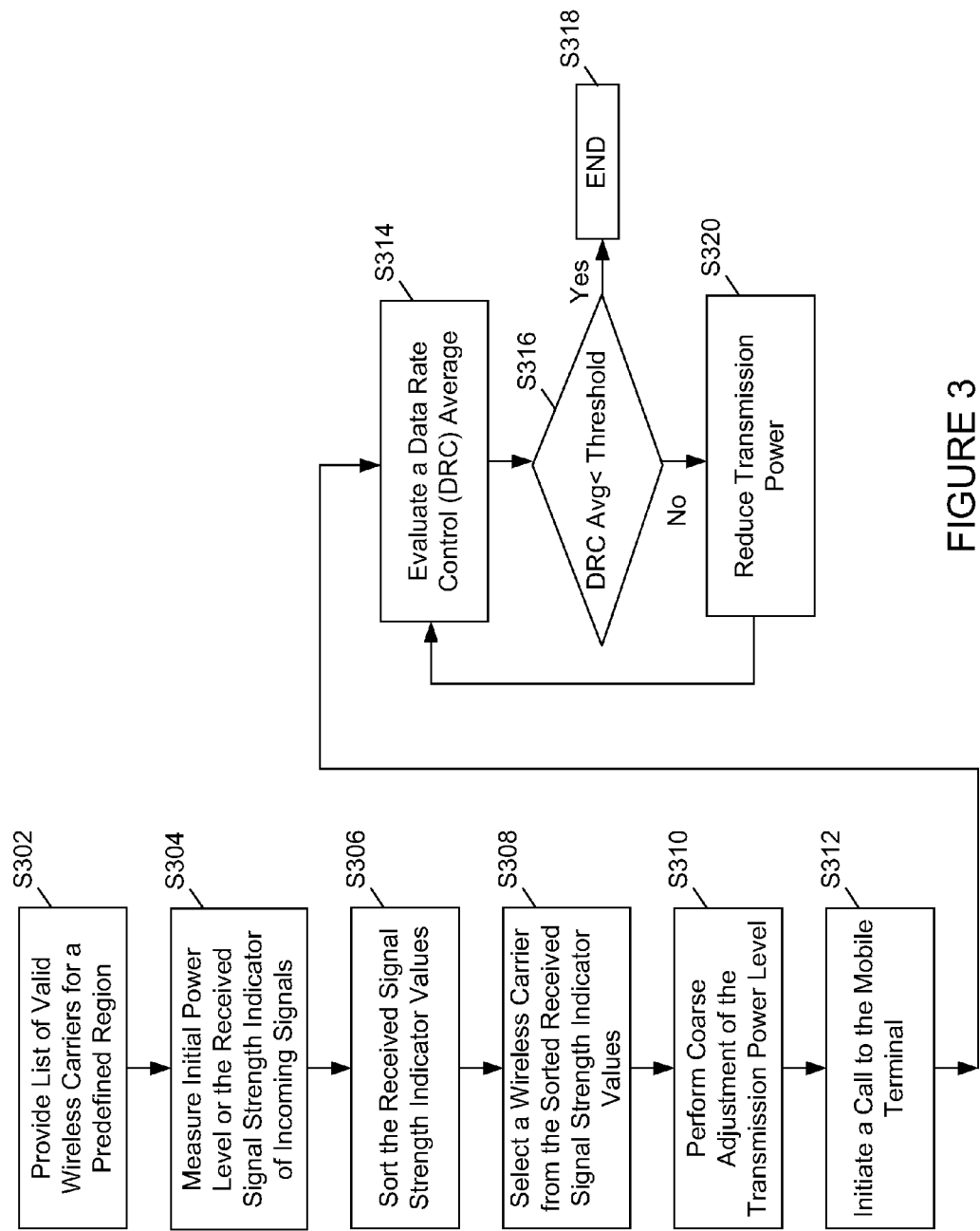
FIG. 3 is a flow diagram of a method for adjusting the power level of a femto cell base station for a 1xEV-DO network in accordance with the principles of the present invention.

An exemplary power adjustment algorithm for the femto base station 125 operating in the 1xEV-DO network is discussed with reference to FIG. 3. At initialization, an operation manager provides a list of valid wireless carriers that are authorized for a preselected region (step S302). In step S304, the initial power level ($I_o$) or the Received Signal Strength Indication ("RSSI") is measured within a selected bandwidth to identify the strength of the incoming signal. The RSSI is sorted from lowest to highest (step S306). A wireless carrier is selected from the highest sorted RSSI (step S308). A coarse adjustment of the transmission power level is performed (step S310). In step S312, the network initiates a call to the mobile terminal. A data rate control (DRC) average is evaluated (step S314). In step S316, a determination is made of whether the DRC is below a threshold. In step S318, the process is terminated when the DRC is below a threshold. If the DRC is not below a threshold, then the transmission power is reduced (step S320). Steps S314-S320 are repeated until the DRC falls below the threshold and the process is terminated in step S318.

The system 100 permits establishing adjustable parameters for the 1xEV-DO network to optimize the power adjustment algorithm of the femto base station 125. The adjustable parameters may include a DRC threshold and filtering constants for the DRC measurements, among other parameters.

Figure 4:
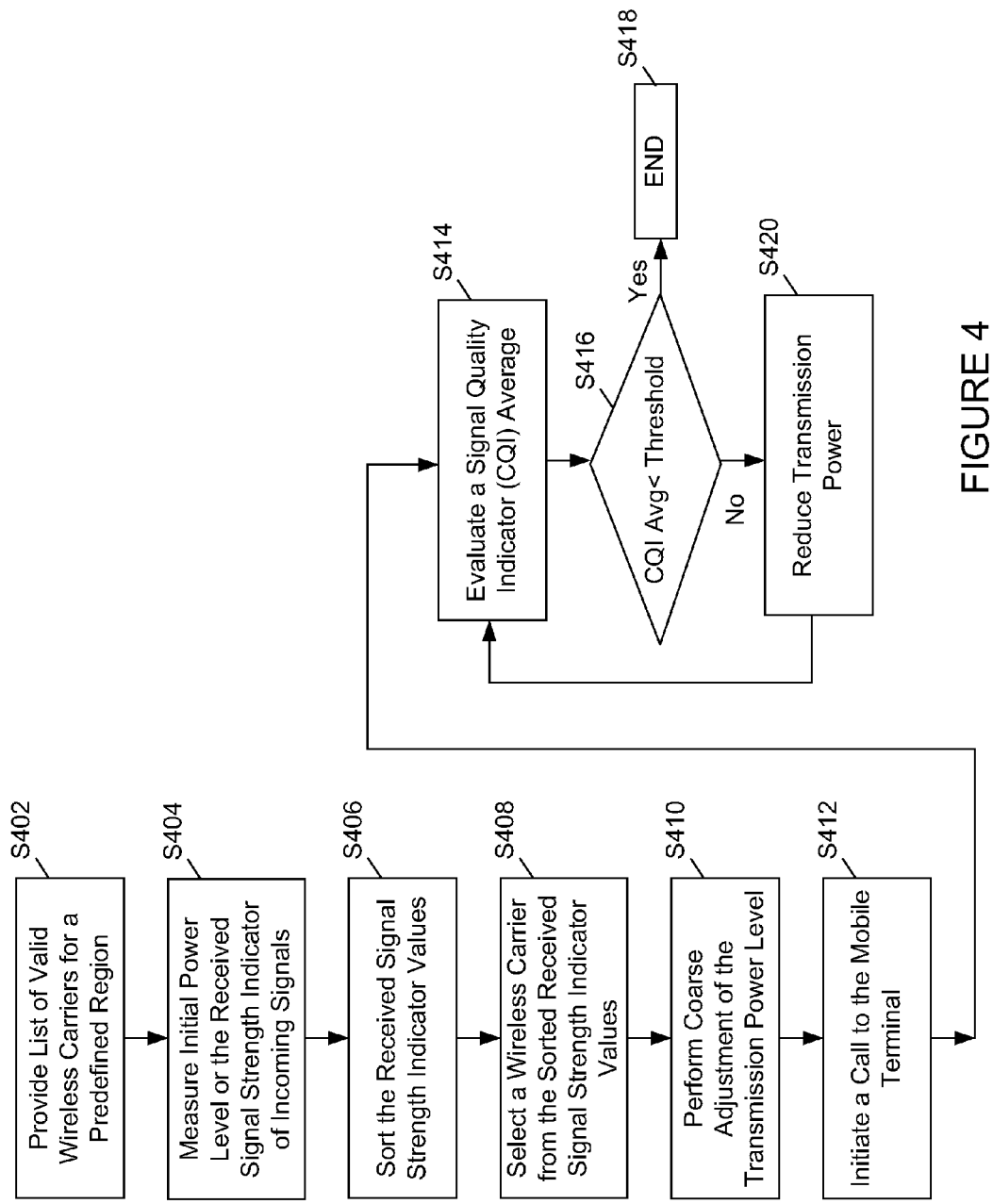
FIG. 4 is a flow diagram of a method for adjusting the power level of a femto cell based station for a Long Term Evolution network in accordance with the principles of the present invention.

An exemplary power adjustment algorithm for the femto base station 125 operating in the 3GPP (LTE) network is discussed with reference to FIG. 4. At initialization, an operation manager provides a list of valid wireless carriers that are authorized for a preselected region (step S402). In step S404, the initial power level ($I_o$) or the Received Signal Strength Indication ("RSSI") is measured within a selected bandwidth to identify the strength of the incoming signal. The RSSI is sorted from lowest to highest (step S406). A wireless carrier is selected from the highest sorted RSSI (step S408). A coarse adjustment of the transmission power level is performed (step S410). In step S412, the network initiates a call to the mobile terminal. A signal quality indicator (CQI) average is evaluated (step S414). In step S416, a determination is made of whether the CQI is below a threshold. In step S418, the process is terminated when the CQI is below a threshold. If the CQI is not below a threshold, then the transmission power is reduced (step S420). Steps S414-S420 are repeated until the CQI falls below the threshold and the process is terminated in step S418.

The system 100 permits establishing adjustable parameters for the 3GPP ("LTE") network to optimize the power adjustment algorithm of the femto base station 125. The adjustable parameters may include a CQI threshold and filtering constants for the CQI measurements, among other parameters.

It should be appreciated that, although the invention is described with reference to the 1xRTT and the EV-DO network, the principles of the invention may be adapted by one of skill in the art to migrate between any networks, including other networks, such as LTE networks, UMTS networks, WiMAX (802.16) networks, other CDMA2000 networks and any other networks known in the art or later developed.

The present invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention. It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of reducing interference between a femto cell and a macro cell in a wireless communication network, the method comprising:
    identifying, using the femto cell, a plurality of preselected wireless signal carriers based on a predefined geographical area;
    measuring, using the femto cell, initial power levels for the wireless signal carriers provided in the predefined geographical area;
    selecting, using the femto cell, one of the wireless signal carriers based on predefined criteria associated with the measured initial power level; and
    adjusting, using the femto cell, a transmission power level of a femto transmitter associated with the femto cell based on a communication placed to a mobile terminal.

2. The method according to claim 1, wherein identifying the plurality of preselected wireless signal carriers is based on the location of the femto cell.

3. The method according to claim 1, wherein measuring the initial power levels for each wireless signal carrier of the plurality of preselected wireless signal carriers includes measuring the receive signal strength indicator of each wireless signal carrier of the plurality of preselected wireless signal carriers.

4. The method according to claim 1, further comprising sorting the measured initial power levels for each wireless signal carrier of the plurality of preselected wireless signal carriers.

5. The method according to claim 1, wherein the predefined criteria associated with selecting one of said plurality of preselected wireless signal carriers includes at least one of supporting a lowest amount of mobile terminal traffic and providing a highest initial power level.

6. The method according to claim 1, wherein adjusting the transmission power level of the femto transmitter is determined based on:

(Measured Macro Cell Initial Power Level)−(Expected Femto Path Loss), wherein the measured macro cell initial power level is a femto measured initial power level for the selected wireless signal carrier and the expected femto path loss is pre-defined variable based on a femto location or a profile for deployment.

7. The method according to claim 1, further comprising requesting a periodic pilot strength measurement and reducing the transmission power if the pilot strength measurement is above a threshold value.

8. The method according to claim 1, further comprising requesting a periodic pilot strength measurement and maintaining the transmission power if the pilot strength measurement is below a threshold value.

9. The method according to claim 1, further comprising obtaining at least one of an average data rate control value and an average signal quality indicator value and reducing the transmission power if at least one of the average data rate control value and the average signal quality indicator value is above a threshold value.

10. The method according to claim 1, further comprising obtaining at least one of an average data rate control value and an average signal quality indicator value and maintaining the transmission power if at least one of the average data rate control value and the average signal quality indicator value is below a threshold value.

11. A system for reducing interference between a femto cell and a macro cell in a wireless communication network, the system comprising:
 a carrier selection module, the carrier selection module configured to:
  identify a plurality of preselected wireless signal carriers based on a predefined geographical area;
  measure initial power levels for each wireless signal carrier of the plurality of preselected wireless signal carriers provided in the predefined geographical area; and
  select one of the plurality of preselected wireless signal carriers based on predefined criteria associated with the measured initial power level; and
 a fine tuning module, the fine tuning module configured to adjust a transmission power level of a femto transmitter based on a communication sent to a mobile terminal,
 wherein the carrier selection module is further configured to identify the plurality of preselected wireless signal carriers based on the location of the femto cell.

12. The system according to claim 11, wherein the carrier selection module measures the initial power levels for each wireless signal carrier of the plurality of preselected wireless signal carriers by measuring the receive signal strength indicator of the plurality of preselected wireless signal carriers.

13. The system according to claim 11, wherein the carrier selection module sorts the measured initial power levels for each wireless signal carrier of the plurality of preselected wireless signal carriers.

14. The system according to claim 11, wherein the carrier selection module applies predefined criteria to select one of the plurality of preselected wireless signal carriers including at least one of supporting a lowest amount of mobile terminal traffic and providing a highest initial power level.

15. The system according to claim 11, further comprising a power control module, the power control module adjusting the transmission power level of the femto transmitter based on:

(Measured Macro Cell Initial Power Level)−(Expected Femto Path Loss), wherein the measured macro cell initial power level is a femto measured initial power level for the selected wireless signal carrier and the expected femto path loss is pre-defined variable based on a femto location or a profile for deployment.

16. The system according to claim 11, wherein the fine tuning module requests a periodic pilot strength measurement and reduces the transmission power if the pilot strength measurement is above a threshold value.

17. The system according to claim 11, wherein the fine tuning module requests a periodic pilot strength measurement and maintains the transmission power if the pilot strength measurement is below a threshold value.

18. The system according to claim 11, wherein the fine tuning module obtains at least one of an average data rate control value and an average signal quality indicator value and reduces the transmission power if at least one of the average data rate control value and the average signal quality indicator value is above a threshold value.

19. The system according to claim 11, wherein the fine tuning module obtains at least one of an average data rate control value and an average signal quality indicator value and maintains the transmission power if at least one of the average data rate control value and the average signal quality indicator value is below a threshold value.

20. The system according to claim 11, wherein to identify the plurality of preselected wireless signal carriers further comprises obtaining a list of valid wireless carriers that are authorized for the predefined geographical area.

* * * * *